United States Patent
Botros

(10) Patent No.: US 9,321,941 B2
(45) Date of Patent: Apr. 26, 2016

(54) TIE-LAYER ADHESIVES FOR STYRENE POLYMERS AND ARTICLES

(75) Inventor: Maged G. Botros, West Chester, OH (US)

(73) Assignee: Equistar Chemicals, LP, Houston, TX (US)

( * ) Notice: Subject to any disclaimer, the term of this patent is extended or adjusted under 35 U.S.C. 154(b) by 314 days.

(21) Appl. No.: 12/006,370

(22) Filed: Jan. 2, 2008

(65) Prior Publication Data

US 2009/0171022 A1    Jul. 2, 2009

(51) Int. Cl.
- C08L 51/06    (2006.01)
- C09J 123/08   (2006.01)
- C08L 53/02    (2006.01)

(52) U.S. Cl.
CPC ............ C09J 123/0815 (2013.01); *C08L 51/06* (2013.01); *C08L 53/02* (2013.01)

(58) Field of Classification Search
CPC ............................. C08L 53/00; C08J 123/08
USPC ..................................................... 525/70, 71
See application file for complete search history.

(56) References Cited

U.S. PATENT DOCUMENTS

| | | |
|---|---|---|
| 4,087,588 A | 5/1978 | Shida et al. |
| 4,139,485 A | 2/1979 | Imokawa et al. |
| 4,298,712 A | 11/1981 | Machonis, Jr. et al. |
| 4,426,498 A | 1/1984 | Inoue et al. |
| 4,440,911 A | 4/1984 | Inoue et al. |
| 4,460,646 A | 7/1984 | Inoue et al. |
| 4,460,745 A | 7/1984 | Adur et al. |
| 4,472,555 A | 9/1984 | Schmukler et al. |
| 4,487,885 A | 12/1984 | Adur et al. |
| 4,684,576 A | 8/1987 | Tabor et al. |
| 4,732,635 A * | 3/1988 | Levens ............ 156/230 |
| 4,861,676 A | 8/1989 | Lee |
| 4,906,690 A | 3/1990 | Hasenbein et al. |
| 4,966,810 A | 10/1990 | Strait et al. |
| 5,017,714 A | 5/1991 | Welborn, Jr. |
| 5,066,542 A | 11/1991 | Tabor et al. |
| 5,070,143 A | 12/1991 | Pucci et al. |
| 5,225,482 A | 7/1993 | Nakagawa et al. |
| 5,277,988 A | 1/1994 | Sugi et al. |
| 5,290,842 A * | 3/1994 | Sasaki et al. ............ 524/271 |
| 5,324,800 A | 6/1994 | Welborn, Jr. et al. |
| 5,434,217 A | 7/1995 | Spelthann |
| 5,591,792 A * | 1/1997 | Hattori et al. ............ 524/271 |
| 5,597,865 A | 1/1997 | Jackson |
| 5,643,997 A * | 7/1997 | Matsuoka et al. ............ 525/71 |
| 5,709,953 A | 1/1998 | Goto et al. |
| 6,068,897 A * | 5/2000 | Adur et al. ............ 428/34.2 |
| 6,171,993 B1 | 1/2001 | Mavridis et al. |
| 6,184,298 B1 * | 2/2001 | Lee ............ 525/240 |
| 6,207,754 B1 | 3/2001 | Yu |
| 6,855,432 B1 | 2/2005 | Hojabr et al. |
| 2005/0256263 A1 * | 11/2005 | Ward ............ 525/70 |

FOREIGN PATENT DOCUMENTS

| | | |
|---|---|---|
| CN | 1049672 A | 3/1991 |
| EP | 0412503 A2 | 2/1991 |
| EP | 0664 327 B1 | 9/1997 |
| JP | 03184843 | 8/1991 |
| WO | WO 2007/047232 A1 | 4/2007 |
| WO | WO 2007/084216 | 7/2007 |

OTHER PUBLICATIONS

Kraton Brochure 2001.*

* cited by examiner

*Primary Examiner* — Mark Kaucher

(57) ABSTRACT

Adhesive compositions for styrene polymers are provided. The adhesives are suitable for use as tie-layers in multi-layer films and sheets and comprise a polyolefin base resin, a functionalized polyolefin and a combination of styrene triblock copolymers.

6 Claims, No Drawings

TIE-LAYER ADHESIVES FOR STYRENE POLYMERS AND ARTICLES

BACKGROUND OF THE INVENTION

1. Field of the Invention

The invention relates to improved tie-layer adhesive blends and their use for multi-layer structures containing one or more styrene polymer layers. They are particularly useful in multi-layer structures where a styrene polymer layer is bonded to a barrier resin layer. The adhesive blends are comprised of a polyolefin base resin, a functionalized polyolefin and a combination of styrene triblock copolymers.

2. Description of the Prior Art

Multi-layer structures are widely used for food packaging applications such as for the production of thermoformed cups, trays and the like. While structures will vary depending on the intended application, styrene polymers are commonly employed as one of the layers to provide structural integrity, i.e., stiffness, and moldability. These structures also typically have an ethylene-vinyl alcohol (EVOH) or polyamide barrier resin layer. A continuing problem within the industry is how to effectively bond the dissimilar resin layers within such multi-layer constructions.

Adhesive compositions referred to as tie-layer adhesives comprised of unmodified and modified, i.e., functionalized, polyolefins and a styrenic polymer have been widely used for this purpose. While numerous tie-layer adhesives of the above types are known, there is a continuing need for adhesive compositions which provide improved adhesion to styrene polymer layers, particularly in multi-layer structures containing styrenic and barrier resin layers.

U.S. Pat. No. 5,709,953 discloses adhesive compositions comprised of 35-65 weight percent (wt. %) ethylene polymer fraction and 35-65 wt. % styrene/aliphatic/styrene triblock elastomer fraction. The reference discloses that all or a portion of the ethylene polymer fraction can be grafted with an unsaturated carboxylic acid or anhydride and, for one embodiment where an ethylene polymer fraction having relative low density is desired, suggests mixing a relatively small amount of grafted high density polyethylene (HDPE) with a relatively large amount of linear low density polyethylene (LLDPE). While the reference broadly discloses styrene/aliphatic/styrene triblock elastomers, styrene-butadiene copolymers are the only triblock copolymer used and there is no indication in the reference to the use of mixtures of styrene copolymers or that any advantage may be realized thereby.

U.S. Pat. No. 6,184,298 discloses adhesive blends containing a modified polyethylene, an unmodified polyethylene and a styrene-based elastomer. Conventional styrene-butadiene copolymers are employed for the reference compositions and triblock styrene resins are not mentioned.

Combinations of polystyrenics and functional polymers and, optionally, polyolefins and/or elastomers are disclosed in U.S. Pat. No. 6,855,432. Blends and mixtures of polystyrenics are indicated to be useful but there is no suggestion to the use of specific triblock blends or that any advantage may be achieved by such use.

Various styrene block copolymers and mixtures are disclosed in combination with amorphous tackifying resins, ethylene polymers and modified ethylene polymers in European Publication No. 0 664 327 A1.

Copending U.S. application Ser. No. 11/332,939 (US-2007-0167569-A1) discloses adhesive blends comprised of specific LLDPE copolymers, a functionalized polyethylene and styrene-isoprene-styrene (SIS) triblock copolymers. Specific SIS copolymers, i.e., containing greater than 35% styrene and less than 1% diblock, are employed to achieve the improved adhesion results reported therein.

SUMMARY OF THE INVENTION

In accordance with the present invention, adhesive compositions which provide significantly improved adhesion to styrenic resins in multi-layer constructions are provided. Even more significant and unexpected, retention of adhesion after thermoforming is markedly improved with the adhesive blends of the invention.

Adhesive compositions of the invention are comprised of 40 to 70 percent, based on the total weight of the composition, ethylene-$C_{4-8}$ α-olefin copolymer having a density from 0.910 to 0.925 g/cm$^3$; 2.5 to 25 percent, based on the total weight of the composition, polyethylene resin grafted with an ethylenically unsaturated carboxylic acid or acid derivative; and 20 to 50 percent, based on the total weight of the composition, styrene-isoprene-styrene and styrene-butadiene-styrene triblock copolymers present at a weight ratio from 5:1 to 1:5.

Particularly advantageous are compositions where the base resin is an ethylene-butene-1 copolymer having a density from 0.912 to 0.920 g/cm$^3$ and melt index from 1 to 10 g/10 min, the functionalized polyolefin is an ethylene-$C_{3-4}$ α-olefin copolymer grafted with 0.5 to 5 weight percent maleic anhydride and the styrene triblock copolymers contain 30 to 55 weight percent styrene and have melt indexes from 10 to 50 g/10 min.

Also disclosed are multi-layer films or sheets wherein the tie-layer adhesive compositions are adhesively bonded to a styrene polymer layer. Styrene polymer layers are preferably polystyrene, high impact polystyrene or mixtures thereof. Multi-layer film or sheet structures wherein the tie-layer adhesive is disposed between a styrene polymer layer and a barrier resin layer are a highly useful embodiment.

DETAILED DESCRIPTION OF THE INVENTION

Improved adhesive compositions suitable for use as tie-layers for multi-layer constructions having one or more styrene polymer layers are provided. More specifically, the adhesives of the invention provide improved adhesion between styrenic polymers, such as polystyrene and high impact polystyrene (HIPS), and barrier resin polymers, such as EVOH and polyamides, used in multi-layer films and sheets such as those used in thermoforming applications for the production of molded cups, trays, etc.

The adhesive compositions of the invention, also referred to herein as adhesive blends and/or tie-layer adhesives, are comprised of a linear low density polyethylene resin, a functionalized ethylene polymer and a mixture of styrene-isoprene-styrene (SIS) and styrene-butadiene-styrene (SBS) triblock copolymers.

The LLDPE resin component, also referred to herein as the base resin, comprises 40 to 70 weight percent (wt. %) of the adhesive blend composition. More preferably, the LLDPE constitutes 45 to 65 wt. % of the adhesive blend and, in a particularly advantageous embodiment of the invention, the LLDPE base resin is present from 50 to 60 wt. %. All weight percentages provided herein for the adhesive blend components are based on the total weight of the adhesive composition.

LLDPE resins utilized for the invention are copolymers of ethylene and $C_{4-8}$ α-olefins obtained using conventional, i.e., Ziegler, Phillips or metallocene, polymerization technology. Comonomer contents will range from 2.5 to 18 wt. %. The copolymer base resins have densities from 0.910 to 0.925 g/cm³ and, more preferably, from 0.912 to 0.920 g/cm³. Melt indexes (MIs) range from 1 to 10 g/10 min and, more preferably, from 1 to 5 g/10 min. Densities and MIs reported herein for the LLDPE and functionalized ethylene polymer components are determined in accordance with ASTM Test Procedures 1505 and 1238 (190° C.; 2.16 Kg), respectively. Copolymers of ethylene and butene-1 and ethylene and hexene-1 are particularly useful.

In one highly useful embodiment, the LLDPE base resin is ethylene-butene-1 copolymer having a density from 0.916 to 0.919 g/cm³ and MI from 1.5 to 3 g/10 min.

The LLDPE base resin may also be an ethylene copolymer having a network structure such as described in U.S. Pat. No. 6,171,993 which is incorporated herein by reference. LLDPE copolymers having a network structure contain hard and soft rubber phases and are reactor-made products. The soft rubber phase is characterized as being an ethylene/comonomer rubber which is highly branched, i.e., contains from about 35 to 65 alkyl branches per 1000 total carbon atoms. The hard phase is ethylene homopolymer or copolymer with low branching content, i.e., alkyl branch contents per 1000 total carbon atoms less than 35. The network structure is believed to be formed, at least in part, by the association of these hard and soft phases in a manner which imparts unique melt elastic properties to the resin. The network structure of the LLDPE copolymers is evidenced by unique rheological behavior upon low shear modification or solution dissolution, namely, when in pelletized form they exhibit a reduction in melt elasticity (ER) of 10 percent or more to a final ER value of 1.0 or less upon rheometric low shear modification or solution dissolution.

Functionalized polyolefins, also referred to herein as modified polyolefins and/or modified polyethylenes, utilized for the adhesive blends are polyethylene resins and, more particularly, ethylene homopolymers and copolymers grafted with an ethylenically unsaturated carboxylic acid or acid derivative in accordance with known procedures. Grafting is generally carried out by heating a mixture of polyethylene and graft monomer(s) with or without a solvent. Most typically, the grafted products are prepared by melt blending the polyethylene in the substantial absence of a solvent with the grafting monomer in a shear-imparting extruder/reactor. Twin screw extruders such as those marketed by Coperion (formerly Werner-Pfleiderer) under the designations ZSK-53, ZSK-83, ZSK-90 and ZSK-92 are especially useful for carrying out the grafting operation. A free radical generating catalyst, such as organic peroxide, can be employed but is not necessary. Maleic anhydride (MAH) is a particularly useful grafting monomer; however, other carboxylic acids and carboxylic acid derivatives such as acrylic acid, maleic acid, fumaric acid, citraconic acid, mesaconic acid, 4-methyl cyclohex-4-ene-1,2-dicarboxylic acid or anhydride, bicyclo [2.2.1]hept-5-ene-2,3-dicarboxylic acid or anhydride, or the like can be employed.

Ethylene homopolymers and ethylene-$C_{4-8}$ α-olefin copolymers having densities from 0.905 to 0.965 cm³ grafted with 0.5 to 5 wt. % MAH are advantageously employed for the adhesive blends of the invention. In one highly useful embodiment, the grafted ethylene polymer is an HDPE resin having a density from about 0.945 to 0.965 g/cm³. In another highly useful embodiment, the grafted ethylene copolymer is a LLDPE resin having a density from about 0.910 to 0.930 g/cm³. The LLDPE being grafted may be the same as the LLDPE base resin. Particularly useful adhesive blends are obtained using HDPE and LLDPE resins grafted with 0.75 to 2.5 wt. % maleic anhydride. The MI of the grafted HDPE or LLDPE component will most generally be in the range from about 0.5 to about 20 g/10 min. and, more typically, from 2.5 to 15 g/10 min.

The modified PE component comprises from 2.5 up to about 25 wt. % of the adhesive blend. More preferably, the graft-modified PE is present in an amount such that it comprises 5 to 20 wt. % of the adhesive blend. In an especially useful embodiment, the graft component comprises 7.5 to 15 wt. % of the blend and is maleic anhydride grafted HDPE or LLDPE.

The adhesive compositions also contain from 20 to 50 wt. % and, more preferably, 25 to 40 wt. % of a combination of styrene-isoprene-styrene and styrene-butadiene-styrene triblock copolymers. The weight ratio of SIS to SBS copolymers ranges from 5:1 to 1:5 and, more preferably, is from 2:1 to 1:2. In one highly useful embodiment the weight ratio of SIS to SBS triblocks is from 1.5:1 to 1:1.5.

SIS and SBS triblock copolymers useful for the invention are commercially available thermoplastic elastomers which contain from 25 up to about 60 wt. % and, more preferably, 30 to 55 wt. % styrene. Triblock copolymers comprising 40 to 50 wt. % styrene and about 50 to 60 wt. % of the respective conjugated diene are particularly useful for the adhesive blends. MIs of the SIS and SBS copolymers typically range from 10 to 50 g/10 min and, more preferably, are in the range 20 to about 45 g/10 min. MIs of the SIS and SBS triblock copolymers are determined in accordance with ASTM D 1238 (200° C.; 5 Kg).

Whereas both SIS and SBS have been used individually in various adhesive formulations, the utilization of a combination of these two triblock copolymers has now unexpectedly been found to produce an effect significantly greater than obtained when either triblock copolymer is used by itself. This effect, namely the ability to significantly improve adhesion to the styrenic layer in multi-layer constructions, is observed not only in the films and sheets used to fabricate molded goods but also in the finished thermoformed articles.

It is a recognized phenomenon by those skilled in the art that adhesion to styrenic layers in a multi-layer films or sheets is reduced, sometimes to unacceptable levels, during molding, e.g., thermoforming, operations. This is the result of a combination of factors but believed primarily to be due to the additional heat history and the stretching and thinning which occurs as the heat-softened sheet is forced against the heated mold and takes on the contours of the mold. A highly desired and surprising feature of the invention is the ability to not only achieve increased adhesion to the styrenic layer in the coextruded multi-layer sheets used for thermoforming but also the ability to retain a higher percentage of this adhesion in the resulting finished article after thermoforming.

The adhesive blends of the invention are obtained by physically mixing and melt blending the LLDPE base resin, functionalized component, SIS and SBS plus any optional components or additives by conventional means known to the art. Melt blending using a Banbury mixer or extruder is especially convenient. The adhesive blend can be pelletized and stored prior to use.

While the adhesive blends are useful without the addition of other components, depending on the end-use application and the particular resins being bonded, it may be advantageous to include other elastomeric components. Ethylene-propylene rubbers (EPRs) and/or ethylene-propylene-diene rubbers (EPDMs) are particularly advantageous for this purpose. These elastomers typically contain greater than 50 wt. % ethylene. EPRs or EPDMs containing 60 wt. % or more ethylene are particularly advantageous. Elastomeric products of this type are obtained by conventional polymerization procedures known to the art and include the so-called metallocene rubbers. Illustrative elastomers of the above type obtainable from commercial sources include BUNA EPT 2070 (22 Mooney ML(1+4)125° C., 69% ethylene), BUNA EPT 2370 (16 Mooney, 3% ethylene norbornene, 72% ethylene), BUNA 2460 (21 Mooney, 4% ethylene norbornene, 62% ethylene), KELTAN EPDM DE244 (Mooney 55, 71% ethylene, 0.2% ethylene norbornene) and NORDEL IP 3720P (20 Mooney; 69% ethylene; 0.5% ethylene norbornene).

Plastomers which are relatively low molecular weight copolymers of ethylene and 2.5 to 13 mole percent $C_{4-8}$ α-olefins and which have properties intermediate to those of thermoplastic materials and elastomeric materials can also be included in the adhesive blends. Plastomers typically have densities from 0.85 to 0.92 $g/cm^3$, and are produced using metallocene or "single site" catalysts having at least one cyclopentadienyl or other suitable ligand coordinated to a transition metal cation. Metallocene catalysts and polymerization processes are described in U.S. Pat. Nos. 5,017,714 and 5,324,800 which are incorporated herein by reference. Highly useful plastomer copolymers are commercially available and described in detail in U.S. Pat. No. 6,207,754 which is incorporated herein by reference.

When included in the blend, the elastomeric or plastomeric component can constitute 1 to 15 wt. % of the adhesive composition and, more preferably, will be present from 5 to 10 wt. %.

One or more stabilizer additives are also typically included in the adhesive blends at levels ranging from about 250 to 5000 ppm and, more preferably, from 500 to 3000 ppm, based on the total composition. Any of the conventional additives or additive packages commonly used to stabilize polyolefins against the deleterious effects of oxygen, heat and light, such as hindered phenols and phosphites, can be used.

The adhesive compositions of the invention are useful for the production of multi-layer constructions where an intermediate layer of adhesive is employed to bond two substrates. They are highly advantageous for bonding dissimilar polymer substrates particularly styrenic polymers and barrier polymers in multi-layer constructions. They are readily extrudable and provide excellent adhesion under a variety of conditions. To facilitate use in extrusion and coextrusion processes, MIs of the adhesive blends will typically be in the range 1 to 6 g/10 min.

The present adhesive blends are particularly well suited for use as tie-layer adhesives for multi-layer laminate coextrusions containing adjacent styrenic polymer and barrier polymer layers. Styrenic polymers can include polystyrene, high impact polystyrene and mixtures of polystyrene with HIPS and styrene di- and triblock copolymers. HIPS typically contains up to about 30 wt. % and, more preferably, between about 10 and about 15 wt. % elastomer. Elastomers used as impact modifiers for HIPS resins include natural rubber and synthetic rubbers, such as styrene-butadiene rubber, acrylonitrile-butadiene rubber, butyl rubber, chloroprene rubber, silicone rubber, acryl rubber, urethane rubber, polybutadiene rubber, ethylene propylene rubber, etc. Barrier resins are typically EVOH or polyamides, such as nylon 6, nylon 6,6 and blends thereof. Copolyesters such as polyethylene terephthalate and polyethylene terephthalate glycol are also commonly used barrier resins.

In addition to the styrenic and barrier layers, one or more other polymer layers may be present in the multi-layer structures. Such additional layers may be, but are not limited to, polyolefins. These additional layers may serve as food contact layers, heat seal layers and the like. Commonly used polyolefin resins for this purpose include LDPE, LLDPE, HDPE and blends thereof. Blends of LDPE with polypropylene, ethylene-vinyl acetate copolymers, ethylene-acrylic acid (ester) copolymers, ethylene-methacrylic acid (ester) copolymers and the like are also commonly employed.

A representative five-layer construction widely used for thermoformable food packaging has the structure Styrenic/Tie 1/Barrier/Tie 2/FCL where "FCL" represents a food contact layer, "Tie 1" represents an adhesive blend of the invention and "Tie 2" may be the same or different adhesive blend. Multi-layer structures produced in accordance with the invention can range in thickness from 3 to 70 mils and, more preferably, are in the range 5 to 50 mils.

The following examples illustrate the invention; however, those skilled in the art will recognize numerous variations which are within the spirit of the invention and scope of the claims.

Tie-layer adhesive compositions prepared and utilized in the examples were pelletized prior to use. This was achieved by dry blending all of the components and melt blending the mixture in a Warner-Pfleiderer ZSK-30 twin screw extruder equipped with a multi-hole (⅛ inch diameter) die connected to a strand cutter. The extruder screw speed was 250 rpm. Temperatures in the extruder ranged from 180° C. to 220° C. Melt temperature at the extruder die was 215° C.

Components used to formulate the adhesive blends of the invention and adhesive blends used for the comparative examples were as follow:

| | |
|---|---|
| BR1 | an ethylene-butene-1 LLDPE copolymer; density 0.918 $g/cm^3$; MI 2 g/10 min |
| BR2 | an ethylene-butene-1, LLDPE copolymer; density 0.925 $g/cm^3$; MI 3.5 g/10 min |
| BR3 | an ethylene-hexene-1 LLDPE copolymer; density 0.918 $g/cm^3$; MI 7 g/10 min |
| MODPE | HDPE grafted with 1.9 wt. % maleic anhydride; density 0.955 $g/cm^3$; MI 9.5 g/10 min |
| SIS1 | styrene-isoprene-styrene triblock copolymer; 44 wt. % styrene; MI 40 g/10 min. |
| SIS2 | styrene-isoprene-styrene triblock copolymer; 30 wt. % styrene; MI 13 g/10 min |
| SBS1 | styrene-butadiene-styrene triblock copolymer; 43 wt. % styrene; MI 23 g/10 min |
| SBS2 | styrene-butadiene-styrene triblock copolymer; 44.5 wt. % styrene; MI 11.5 g/10 min |
| AO | a 1:1 blend of Irganox ® 1010 and Irgafos ® 168 |

Example 1 and Comparative Examples 2, 3 and 4

To demonstrate the improved results of the invention, an adhesive blend of the invention (Ex 1) comprised of LLDPE, functionalized HDPE, SIS and SBS was prepared. For comparative purposes, three adhesive blends (CEx 2, CEx 3 and CEx 4) were also prepared from the same LLDPE and functionalized HDPE but using only one of the triblock components. Compositions of the adhesive formulations were as follow:

| | Ex 1 | CEx 2 | CEx 3 | CEx 4 |
|---|---|---|---|---|
| BR1 | 59.8 | 59.8 | 59.8 | 59.8 |
| MODPE | 10 | 10 | 10 | 10 |
| SIS1 | 15 | 30 | — | — |
| SBS1 | 15 | — | 30 | 35 |
| AO | 0.2 | 0.2 | 0.2 | 0.2 |

To evaluate adhesion to styrenic substrates, Ex 1, CEx 2 and CEx 3 were used to bond two HIPS layers to form a 3-layer 19 mil thick sheet. The sheet configuration and composition were as follows:

HIPS (48.5%)/tie (3%)/HIPS (48.5%)

The HIPS used had a MI of 8 g/10 min and contained 8% rubber. It also contained 3.5 wt. % of a 60% white ($TiO_2$) concentrate. The 3-layer sheets were produced on a Killion laboratory scale film line using two 1-inch extruders in an A/B/A configuration and a 10-inch flat die. Adhesion at the HIPS/tie layer interface was determined in accordance with ASTM D 1876-93. The blend of the invention (Ex 1) gave an adhesion value of 2.34 lbs/in whereas adhesion values obtained with CEx 2 and CEx 3 were only 1.77 and 1.62 lbs/in, respectively. Adhesion results reported are the average obtained for three samples.

To further demonstrate the advantageous results obtained with the adhesive blends of the invention 5-layer coextruded sheet having the following configuration and composition was prepared.

styrenic (82%)/tie (2%)/EVOH (6%)/tie (2%)/polyolefin (8%)

The styrenic polymer used was a 50/50 blend of polystyrene and HIPS containing 3.6 wt. % $TiO_2$. The EVOH was a commercial resin obtained from Nippon Gohsei and contained 32 mole percent ethylene. The polyolefin was a blend of 92% LDPE and 8% polypropylene. Five-layer 44 mil thick sheets were prepared using Ex 1, CEx 2 and CEx 4 as the tie-layer adhesives. Twenty-eight inch wide five-layer sheets were prepared on a Welex coextrusion sheet line operating at 7.2 feet/minute using four extruders. Screw speed, head pressure and melt temperature at the die for each of the extruders were as follows:

|  | Screw Speed (rpm) | Head Pressure (psi) | Melt Temp. (° F.) |
| --- | --- | --- | --- |
| Styrenic polymer | 90 | 2090 | 428 |
| Tie | 80 | 1580 | 421 |
| EVOH | 42 | 1370 | 415 |
| Polyolefin | 9 | 1170 | 412 |

Adhesion values at the styrene polymer/tie interface (the average obtained for three samples taken from the center and approximately 3 inches in from each side of the 28 inch wide sheet) were obtained for the inventive and comparative tie-layer compositions. Results were as follow:

| Ex 1 | 12.11 lbs/in |
| --- | --- |
| CEx 2 | 10.58 lbs/in |
| CEx 4 | 8.76 lbs/in |

The above data clearly show the benefit of using the adhesive blends of the invention containing the SIS/SBS mixture. Even when a higher percentage of one of the components was used (35% SBS in CEx 4), adhesion to the PS/HIPS was significantly less than obtained using the inventive adhesive composition of Ex 1.

Even more unexpected is the ability of the tie-layer adhesive compositions of the invention to retain a higher level of adhesion to the PS/HIPS after vacuum thermoforming. To demonstrate this highly desirable feature, 3 inch diameter, 3 inch deep round cups were thermoformed using the 44 mil 5-layer sheet produced above. For the thermoforming, the sheet was preheated to 171° C. for 30 seconds and vacuum molded for 25 seconds. The PS/HIPS layer formed the outer layer of the cup which had a wall thickness of 20 mil. As expected, after thermoforming adhesion at the styrenic/tie interface was reduced for all the samples; however, the thermoformed cup produced from the sheet obtained using the inventive tie-layer composition (Ex 1) retained a significantly higher percentage of the original adhesion value. Results were as follow:

|  | Adhesion Before Thermoforming | Adhesion After Thermoforming | Percent Retention of Original Adhesion |
| --- | --- | --- | --- |
| Ex 1 | 12.11 | 6.4 | 53 |
| CEx 2 | 10.58 | 3.1 | 29 |
| CEx 4 | 8.76 | 2.8 | 32 |

Example 5 and Comparative Examples 6 and 7

To demonstrate the ability to vary the composition of the adhesive blend and use of the tie-layer adhesive in different multi-layer structures, an adhesive blend (Ex 5) comprised of a different LLDPE base resin and different SIS and SBS components was prepared. Two comparative blends (CEx 6 and CEx 7) were also prepared and evaluated. Compositions of the blends were as follow:

|  | Ex 5 | CEx 6 | CEx 7 |
| --- | --- | --- | --- |
| BR2 | 59.8 | 59.8 | 59.8 |
| MODPE | 10 | 10 | 10 |
| SIS2 | 15 | 30 | — |
| SBS2 | 15 | — | 30 |
| AO | 0.2 | 0.2 | 0.2 |

Ex 5 and the comparative blends (CEx 6 and 7) were utilized as the tie-layer for 7 mil 5-layer sheet configured as follows:

styrenic (82%)/tie (2%)/EVOH (6%)/tie (2%)/LDPE (8%)

The LDPE had a density of 0.923 g/cm³ and MI of 3.7 g/10 min. The styrenic polymer and EVOH were the same as used for preparation of the previous 5-layer structure. Extrusion equipment and conditions were also the same previously described. Adhesion at the styrenic/tie interface and at the EVOH/tie interface were determined using each of the adhesive blends and are tabulated below.

|  | Styrenic/Tie Adhesion (lbs/in) | EVOH/Tie Adhesion (lbs/in) |
| --- | --- | --- |
| Ex 5 | 0.6 | 1.6 |
| CEx 6 | 0.41 | 1.58 |
| CEx 7 | 0.25 | 1.41 |

It is apparent from the above data that while all of the blends (inventive and comparative) had good adhesion to the barrier (EVOH) resin, the adhesive blend of the invention obtained using a combination of SIS and SBS components provided significantly improved adhesion to the PS/HIPS layer compared to adhesive blends CEx 6 and CEx 7 formulated using the same level of only one of the triblock copolymers.

Example 8 and Comparative Examples 9 and 10

Following the procedures described above, adhesive blends were prepared as follow:

|       | Ex 8 | CEx 9 | CEx 10 |
|-------|------|-------|--------|
| BR3   | 59.8 | 59.8  | 59.8   |
| MODPE | 10   | 10    | 10     |
| SIS1  | 15   | 30    | —      |
| SBS2  | 15   | —     | 30     |
| AO    | 0.2  | 0.2   | 0.2    |

The blends were used as tie-layer adhesives for 5-layer 7 mil sheet as described for Ex 5 and adhesion results (styrenic to tie) were as follow:

| Ex 8   | 0.77 lbs/in |
|--------|-------------|
| CEx 9  | 0.57 lbs/in |
| CEx 10 | 0.35 lbs/in |

Example 11

An adhesive blend containing 59.8 wt. % BRI, 10 wt. % MODPE, 15 wt. % SIS2, 15 wt. % SBS2 and 0.2 wt. % AO was prepared in accordance with the usual procedure and evaluated as a tie-layer adhesive in a 5-layer 7-mil sheet of the type described for Ex 5. Adhesion at the styrenic/tie interface was 1.2 lbs/in.

What is claimed is:

1. An adhesive composition comprising:
    (a) 50 to 60 wt. % of an ethylene-butene-1 copolymer having a density from 0.916 to 0.919 g/cm$^3$ and a melt index from 1.5 to 3 g/10 min, wherein the ethylene-butene-1 copolymer contains a hard phase and a soft rubber phase;
    (b) 5 to 20 wt. % of a high density polyethylene has a density of about 0.955 g/cm$^3$ and grafted with 0.75 to 2.5 wt. % maleic anhydride maleic anhydride, and wherein (b) has a melt index from 2.5 to 15 g/10 min, as measured at 190° C., 2.16 kg; and
    (c) 25 to 40 wt. % of a mixture comprising a styrene-isoprene-styrene triblock copolymer and styrene-butadiene-styrene triblock copolymer, wherein the styrene-isoprene-styrene triblock copolymer and the styrene-butadiene-styrene triblock copolymer are present at a weight ratio from 5:1 to 1:5,
    wherein the mixture comprises 30 to 55 wt. % styrene derived units, and
    wherein the mixture has a melt index from 10 to 50 g/10 min measured at 200° C./5 kg;
    (d) an additive comprising
        a stabilizer comprising a hindered phenol and phosphite at a weight ratio of 1:1;
    wherein the adhesive composition is characterized by an adhesion value as measured in accordance with ASTM D 1876-93 of 2.34 lbs/in when bonded to two styrene polymer layers.

2. The adhesive composition of claim 1 wherein the weight ratio of styrene-isoprene-styrene triblock copolymer to styrene-butadiene-triblock copolymer is 1.5:1 to 1:1.5.

3. The adhesive composition of claim 1 wherein the mixture of the styrene-isoprene-styrene triblock copolymer and the styrene-butadiene-styrene triblock copolymer has a melt index from 20-45 g/10 min.

4. The adhesive composition of claim 1 wherein the styrene-isoprene-styrene triblock copolymer and the styrene-butadiene-styrene triblock copolymer are present in a weight ratio from 1:1.

5. The composition of claim 1 wherein the stabilizer is at a level ranging from about 250 to about 5000 ppm.

6. An adhesive composition consisting essentially of:
    (a) 59.8 wt. % ethylene-butene-1 copolymer having a density of about 0.918 g/cm$^3$, wherein the ethylene-butene-1 copolymer contains a hard phase and a soft rubber phase;
    (b) 10 wt. % high density polyethylene having a density of about 0.955 g/cm$^3$ grafted with about 1.9 wt. % maleic anhydride, wherein (b) has a melt index from 2.5 to 15 g/10 min, as measured at 190° C., 2.16 kg; and
    (c) 30 wt. % styrene-isoprene-styrene triblock copolymer and styrene-butadiene-styrene triblock copolymer, wherein the styrene-isoprene-styrene triblock copolymer and the styrene-butadiene-styrene triblock copolymer are present at a weight ratio from 1:1; and
    (e) a stabilizer present at 0.2 wt. %;
    wherein the adhesive composition is characterized by an adhesion value as measured in accordance with ASTM D 1876-93 of 2.34 lbs/in when bonded to two styrene polymer layers.

* * * * *